(12) United States Patent
Castany

(10) Patent No.: US 12,228,767 B2
(45) Date of Patent: Feb. 18, 2025

(54) INTEGRATED OPTICAL COMPONENT HAVING AN EXPANDED LIGHT BEAM

(71) Applicant: COMMISSARIAT A L'ENERGIE ATOMIQUE ET AUX ENERGIES ALTERNATIVES, Paris (FR)

(72) Inventor: Olivier Castany, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 131 days.

(21) Appl. No.: 17/805,760

(22) Filed: Jun. 7, 2022

(65) Prior Publication Data

US 2022/0397728 A1 Dec. 15, 2022

(30) Foreign Application Priority Data

Jun. 11, 2021 (FR) ..................... 21 06181

(51) Int. Cl.
| | |
|---|---|
| *G02B 6/12* | (2006.01) |
| *G02B 6/124* | (2006.01) |
| *G02B 6/30* | (2006.01) |
| *G02B 6/42* | (2006.01) |

(52) U.S. Cl.
CPC ..... *G02B 6/12002* (2013.01); *G02B 6/12004* (2013.01); *G02B 6/305* (2013.01); *G02B 2006/12147* (2013.01); *G02B 6/124* (2013.01); *G02B 6/4214* (2013.01)

(58) Field of Classification Search
CPC .. G02B 6/4201; G02B 6/4204; G02B 6/4214; G02B 6/12002; G02B 6/12004; G02B 6/30; G02B 6/34; G02B 2006/12102; G02B 2006/12104; G02B 2006/12107; G02B 2006/12147
See application file for complete search history.

(56) References Cited

U.S. PATENT DOCUMENTS

| | | | |
|---|---|---|---|
| 9,671,563 B2 | 6/2017 | Doany et al. | |
| 9,910,259 B2 * | 3/2018 | Armbruster | ............. F41G 1/345 |
| 10,209,442 B2 | 2/2019 | Menezo et al. | |

(Continued)

FOREIGN PATENT DOCUMENTS

| | | | | |
|---|---|---|---|---|
| CN | 107224267 A | * | 10/2017 | ............... A61B 3/12 |
| FR | 3066617 A1 | * | 11/2018 | ......... G02B 6/12002 |
| FR | 3 066 615 B1 | | 11/2019 | |

OTHER PUBLICATIONS

Machine translation of FR-3066617-A1. (Year: 2018).*

(Continued)

*Primary Examiner* — Daniel Petkovsek
*Assistant Examiner* — Emma R. Oxford
(74) *Attorney, Agent, or Firm* — Oblon, McClelland, Maier & Neustadt, L.L.P.

(57) ABSTRACT

An integrated optical component, including a transparent pad arranged on the upper face of the basic optical component, the transparent pad including a plane mirror at its upper face, and the basic optical component including a convergent mirror at its upper face, the plane and convergent mirrors being arranged such that the light beam is propagated between the internal light gate and the external light gate by passing through the transparent pad by reflection on the plane mirror and by reflection on the convergent mirror.

19 Claims, 8 Drawing Sheets

(56) References Cited

U.S. PATENT DOCUMENTS

| | | |
|---|---|---|
| 10,459,163 B2 | 10/2019 | Menezo et al. |
| 10,481,334 B2 | 11/2019 | Israel et al. |
| 10,564,374 B2 | 2/2020 | Israel et al. |
| 10,690,848 B2 | 6/2020 | Menezo et al. |
| 2006/0239605 A1* | 10/2006 | Palen ............... G02B 6/423 385/33 |
| 2017/0030773 A1* | 2/2017 | Han ............... G01J 3/0205 |
| 2018/0101105 A1* | 4/2018 | Freimann ............ G02B 7/1828 |
| 2018/0335566 A1* | 11/2018 | Menezo ............... G02B 6/34 |
| 2019/0265421 A1 | 8/2019 | Ji et al. |
| 2019/0324211 A1 | 10/2019 | Israel et al. |
| 2020/0194294 A1* | 6/2020 | Jang ............... G01J 3/1804 |
| 2020/0264050 A1* | 8/2020 | Auner ............... G01N 21/0303 |
| 2021/0165165 A1 | 6/2021 | Israel et al. |
| 2021/0328686 A1* | 10/2021 | Zhou ............... H04B 10/803 |
| 2021/0333491 A1 | 10/2021 | Menezo |
| 2023/0084003 A1* | 3/2023 | Taha ............... G02B 6/4214 385/31 |
| 2023/0130045 A1* | 4/2023 | Taha ............... G02B 6/4243 385/88 |
| 2023/0204876 A1* | 6/2023 | Krichevsky ......... G02B 6/4207 385/14 |
| 2023/0204877 A1* | 6/2023 | Heck ............... G02B 6/4214 385/14 |

OTHER PUBLICATIONS

Machine translation of CN 107224267 A. (Year: 2017).*
French Preliminary Search Report Issued Mar. 2, 2022 in French Application 21 06181 filed on Jun. 11, 2021 (with English Translation of Categories of Cited Documents), 10 pages.
Bernabé et al., "On-board Silicon Photonics-Based Transceivers with 1-Tb/s Capacity", IEEE Transactions on Components, Packaging and Manufacturing Technology, vol. 6, No. 7, Jul. 2016, 8 Pages.
Bernabé et al., "Photonic Modules for Data Centers Require Cutting Edge Technologies", Chip Scale Review, 2017, 4 Pages.
Mathai et al., "Detachable 1×8 Single Mode Optical Interface for DWDM Microring Silicon Photonic Transceivers", Optical Interconnects XX. International Society for Optics and Photonics, 2020, 11 Pages.

* cited by examiner

INTEGRATED OPTICAL COMPONENT HAVING AN EXPANDED LIGHT BEAM

TECHNICAL FIELD

The field of the invention is that of on-chip integrated photonics. The invention relates more specifically to the optical coupling of a photonic chip with an external device, for example with another photonic chip, an optical fibre or a set of optical fibres.

STATE OF THE ART

Integrated optical components, in particular on-silicon photonic components, can combine numerous functions on one same chip, also called PIC (photonic integrated circuit). In these components, light is driven into small optical guides, of a width typically less than one micrometre, between functional blocks densely distributed within the PIC.

These integrated optical components are intended to communicate with external systems by exchanging light by optical coupling. A challenge linked to optical coupling is to limit optical losses. Coupling is particularly difficult in the case of monomode optical beams, intended for example to be coupled in optical fibres, due to the low diameter of the light beams brought into play.

In on-silicon photonics, the light transported in the plane of the PIC can be directed outside of the plane by dedicated functional elements, like for example diffraction networks, and coupled with a cleaved or polished monomode fibre forming an angle with the vertical, typically of around 8°.

The monomode light beams coming from these optical components generally have a diameter close to 10 micrometres. Direct coupling with a monomode optical fibre is possible, but it is however difficult, as the optical fibre must be positioned with a sufficient coupling rate and limit optical losses.

This placement precision is difficult to achieve and requires using dedicated machines, which are expensive and slow. To facilitate coupling and increase the positioning tolerance, a solution consists of expanding the diameter of the light beam exiting from the integrated optical component up to a few tens of microns. For example, a light beam having a diameter of 50 μm makes it possible to increase the positioning tolerance to ±10 μm. The alignment and positioning constraints are relaxed and it is no longer necessary to use high-precision machines. The assembly can subsequently be done by less expensive and quicker machines.

Document FR3066617 A1 discloses a solution making it possible to widen the beam by benefiting from the thickness of the substrate on which the integrate optical component is manufactured. The substrate is of the SOI (Silicon On Insulator) type, and comprises a buried silica layer called BOX (Buried Oxide). A mirror opposite behind the substrate makes it possible to reflect the light beam in the direction of the front face where the coupling is provided with an optical connector. The natural diffraction of the beam leads to an expansion of the beam as this is propagated through the substrate. The length of the trajectory of the beam in the substrate thus determines the size of the beam obtained in the front face. The diameter of the beam in the front face is thus significantly increased.

In practice, this solution has the disadvantage of being complex to manufacture, which induces a relatively high cost. There is a need consisting of optimising such an integrated optical component.

US2021/165165 A1 and US2019/265421 A1 disclose solutions for coupling a PIC and an optical fibre via plane and converging mirrors. The precision of the assembly of the PIC and the optical fibre remains quite critical with this type of solution.

An aim of the present invention is to meet this need and to propose an integrated optical component which overcomes at least partially some of the abovementioned disadvantages.

Other aims, characteristics and advantages of the present invention will appear upon examining the following description and the accompanying drawings. It is understood that other advantages can be incorporated. In particular, certain characteristics and certain advantages of the integrated optical component can apply mutatis mutandis to the optical system and/or to the method for manufacturing this component, and conversely.

SUMMARY

To achieve this aim, according to an embodiment, an integrated optical component is provided, configured to ensure a propagation of a light beam between a first light gate called internal and a second light gate called external. The light beam typically has an optical axis, a first cut surface taken transversally to the optical axis at the first light gate, and a second cut surface taken transversally to the optical axis at the second light gate, such that the size of the second cut surface is strictly greater, and preferably at least three times greater, than the size of the first cut surface. This integrated optical component comprises a basic optical component comprising said internal light gate.

The basic optical component has a first face called lower face and a second face called upper face, opposite the lower face. The internal light gate is configured to emit or receive the respectively divergent or convergent light beam, along a trajectory passing through the upper face.

Advantageously, the integrated optical component further comprises a transparent layer arranged on the upper face of the basic optical component. This transparent layer has a third face opposite and parallel to the upper face of the basic optical component. The transparent layer comprises the external light gate at said third face.

Advantageously, the transparent layer also comprises a plane mirror located on or at the third face and rotated opposite the upper face of the basic optical component. The basic optical component comprises a convergent mirror, for example located on or at the upper face, rotated opposite said third face of the transparent layer.

Advantageously, the plane and convergent mirrors are arranged such that the light beam is propagated between the internal light gate and the external light gate by passing through the transparent layer by reflection on the plane mirror and by reflection on the convergent mirror.

Thus, in the case where the internal light gate emits a divergent light beam, this light beam is propagated in the basic optical component in the direction of the upper face, then in the transparent layer. It is then reflected by the plane mirror in the direction of the convergent mirror, then again reflected by the convergent mirror in the direction of the external light gate. The light beam is expanded in particular within the transparent layer during its trajectory between the internal gate and the plane mirror, then between the plane mirror and the convergent mirror. The convergent mirror can typically then act as collimator to form a parallel light beam. This makes it possible to widen the light beam such that it has an increased size at the externa light gate. In the case of a circular-section beam, this means that the diameter at the external gate is significantly greater than its initial diameter at the internal light gate. The light beam is thus advantageously expanded during its passage into the transparent layer. Below, this transparent layer is also called "transparent pad".

The integrated optical component also operates in the case where the internal light gate is configured to receive a convergent light beam. According to the principle of reversibility of light, a light beam, preferably a parallel beam, incident at the external light gate, is propagated in the direction of the convergent mirror, then is reflected towards the plane mirror in the direction of the internal light gate. The beam travelling this trajectory is narrowed such that it has a minimum diameter at the internal light gate, significantly less than its initial diameter at the external light gate.

In the scope of development of the present invention, it appears that the solution proposed in document FR3066617 A1 implies that the light beam must pass through the interfaces between the silica and the silicon several times. The strong refraction index contrast between these materials has the consequence that a significant portion of the light, around 15%, is reflected and therefore lost. The introduction of an anti-reflective layer at the interfaces could improve this solution. However, for technological reasons, it appears difficult and expensive to place such an anti-reflective layer at the interfaces between the silica and the silicon in the integrated optical component architecture proposed by this document FR3066617 A1. Another disadvantage of this known solution, which has been identified in the scope of the development of the present invention, is linked to the fulfilment of a mirror in the rear face of the substrate. This involves, in particular, protecting the front face during the manufacture of this mirror in the rear face, then removing this protection. This increases the manufacturing cost. Another disadvantage also identified in the scope of the development of the present invention, is that the thickness of the substrate, in the integrated optical component disclosed by document FR3066617 A1, cannot be chosen independently of the desired beam diameter. This leads to additional sizing constraints.

In the present invention, the light beam does not pass through a substrate, which avoids inconvenient, interfering reflections. This makes it possible to limit optical losses. Moreover, the thickness of the substrate can be chosen independently from the desired beam widening, for example according to constraints linked to heat dissipation or to electrical connections.

The reflection on the plane mirror is not affected by a lateral translation of the plane mirror, i.e. a translation in the plane of the plane mirror. The lateral positioning of the transparent pad on the basic optical component thus tolerates an imprecision in positioning greater than 2 μm, even greater than 5 μm, even greater than 10 μm. The transparent pad can thus be assembled to the basic optical component by using standard industrial chip placement equipment (equipment called "pick-and-place"), typically offering a precision of ±10 μm. This makes it possible to limit the manufacturing costs of such an integrated optical component.

Moreover, the external light gate is typically non-specific and can be coupled with different standard optical connectors. The external light gate is typically presented in the form of a preferably flat portion of the third face. The integrated optical component according to the present invention can thus be coupled with different optical connectors with an expanded beam. The compatibility of the integrated optical component with different optical connectors is thus improved.

Another aspect of the invention relates to a system comprising at least one integrated optical component such as described above and an optical connector coupled with the external light gate. Another aspect of the invention relates to a method for manufacturing an integrated optical component comprising a formation of the basic optical component on a first substrate and a formation of the transparent layer and of the plane mirror on a second substrate, and comprising an extension and an assembly of said transparent layer on the basic optical component, said assembly being done using a polymer interposing layer. The architecture of the integrated optical component enables a positioning tolerance of the transparent pad on the sufficiently raised basic optical component. For challenges with costs and industrial production, it is thus advantageous to separately manufacture basic optical components, for example within a first production line, and a transparent layer or pads each comprising a plane mirror, for example, within a second production line, then to assemble them, typically using an adhesive polymer layer. Such integrated optical components can also be easily coupled with optical connectors coming from a third production line.

BRIEF DESCRIPTION OF THE FIGURES

The aims, objectives, as well as the characteristics and advantages of the invention will best emerge from the detailed description of embodiments of the latter, which are illustrated by the following accompanying drawings, wherein.

Figure 1:
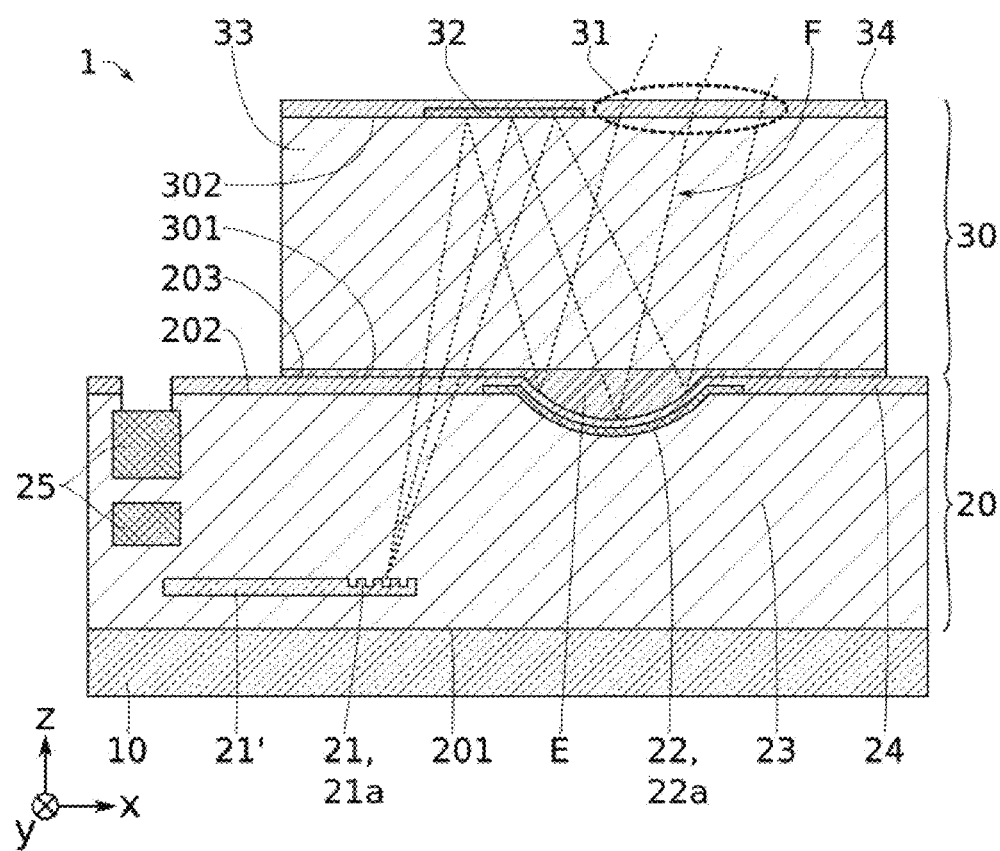
FIG. 1 schematically illustrates an integrated optical component according to an embodiment of the present invention.

The drawings are given as examples and are not limiting of the invention. They constitute principle schematic representations intended to facilitate the understanding of the invention and are not necessarily to the scale of the practical applications. In particular, on the principle diagrams, the dimensions of the different elements (components, pad, mirrors, connectors, etc.) are not necessarily representative of reality.

DETAILED DESCRIPTION

Before starting a detailed review of embodiments of the invention, optional characteristics are stated below, which can possibly be used in association or alternatively:

According to an example, said plane and convergent mirrors are arranged such that the light beam is propagated between the plane mirror and the convergent mirror without fully passing through, preferably without penetrating into, a layer including the internal light gate.

According to an example, said plane and convergent mirrors are arranged such that the light beam is propagated between the plane mirror and the convergent mirror by only passing through the transparent pad and possible transparent interposing layers.

According to an example, projecting along an axis perpendicular to the plane mirror, the convergent mirror is located between the internal light gate and the external light gate.

According to an example, the integrated optical component comprises a substrate and the basic optical component is carried by the substrate at the lower face.

According to an example, the plane mirror is interposed on the trajectory of the light beam between the internal light gate and the convergent mirror. It is in particular parallel to the upper face of the basic optical component. The fact that it is flat and parallel to the upper face makes it possible to increase the placement tolerance as regards the internal light gate.

According to an example, the convergent mirror is interposed on the trajectory of the light beam between the external light gate and the plane mirror. This makes it possible, for example, to return a light beam with parallel rays to the external light gate. According to an example, the convergent mirror has a focal distance configured to return a light beam with parallel rays to the external light gate. According to an example, the convergent mirror is located at the upper face of the basic optical component.

According to an example, the internal light gate is configured such that the light beam has light rays not parallel to one another between the internal light gate and the plane mirror, and between the plane mirror and the convergent mirror. The light beam can thus be widened or narrowed over the whole trajectory between the internal light gate and the convergent mirror, according to the propagation direction of the light beam. The beam can in particular be expanded during its propagation from the internal light gate to the plane mirror, and from the plane mirror to the convergent mirror.

According to an example, the convergent mirror is configured such that the light beam has light rays parallel to one another between the external light gate and said convergent mirror. The light beam exiting from the external light gate is thus collimated. This makes it possible to improve the compatibility of the integrated optical component with other elements, typically with standard optical connectors. According to an example, the convergent mirror has a focal distance f of between 0.8 L and 1.2 L, L being a length of the trajectory of the light beam being propagated between the internal light gate and the convergent mirror.

According to an example, the integrated optical component is configured such that the trajectory of the light beam between the internal light gate and the plane mirror passes through the upper face of the basic optical component at the periphery of the convergent mirror. The compactness of the component is thus improved.

According to an example, the external light gate is located at the periphery of the plane mirror. This also improves the compactness of the component.

According to an example, the internal light gate is a vertical coupler configured to emit or receive the light beam along an optical axis having an angle θ of between 5° and 20°, typically 8°, as regards a normal direction to the second and third faces. For example, the vertical coupler is achieved thanks to a diffraction network and forms a vertical coupler with a diffraction network, also called "vertical grating coupler". The diffraction network is not necessarily orthogonal to the optical axis. The diffraction network can be rectangular, or have a substantially triangular shape, or other. The light beam coming from the network does not necessarily have a section of the same shape as that of the network. The light beam is substantially formed of Gaussian optics, i.e. that it has, in the cross-section, a distribution of Gaussian intensity. The optical axis changes direction during reflections and/or passing interface, for example at the outlet interface of the component.

According to an example, the convergent mirror is chosen from among a spherical or parabolic curved mirror, or Fresnel mirror, or a diffractive mirror. According to an example, typically for a diffractive convergent mirror, the convergent mirror is located in an intermediate plane between the internal light gate and the plane mirror. According to an example, the convergent mirror is located in an intermediate plane between the internal light gate and the upper face. Thus, the internal light gate intercepts a first plane normal to the direction z, the upper face extends along a second plane normal to the direction z, the internal light gate intercepts a third plane normal to the direction z, and the convergent mirror intercepts an intermediate plane normal to the direction z, located between the first and third planes, preferably between the first and second planes.

According to an example, the internal light gate is chosen from among a diffraction network, a deflector mirror associated with an end of a waveguide, a photodetector, a vertical cavity surface emitting laser (VCSEL). This list is not exhaustive and different internal light gates can thus be considered. These internal light gates can be purely emissive, such as VCSELs, or purely receptive, such as photodetectors or photodiodes, or also two-directional internal light gates, operating in emission or in reception.

According to an example, the transparent pad has a height h in a direction normal to the third face, of between 50 μm and 300 μm.

According to an example, the size of the second surface of the light beam is at least three times greater, and preferably at least five times greater, than the size of the first surface.

According to an example, the integrated optical component comprises a polymer interposing layer between the transparent pad and the basic optical component. This makes it possible, for example, to bond a transparent pad applied to the basic optical component. The transparent pad can thus be manufactured separately.

According to an example, the transparent pad and the basic optical component are silica-based, having a refraction index n.

According to an example, the polymer interposing layer is transparent polymer-based having a refraction index np such that $0.9 \text{ n} \leq n_p \leq 1.1 \text{ n}$. This makes it possible to avoid interfering reflections when the light beam passes through the polymer interposing layer. According to another example, the polymer interposing layer is transparent polymer-based having a refraction index np such that $1.2 \leq n_p \leq 1.7$.

According to an example, the polymer interposing layer fills a space between the convergent mirror of the basic optical component and the transparent pad. This makes it possible, for example, to accommodate a difference in shape between the transparent pad and the convergent mirror. The polymer interposing layer thus ensures a continuity of material between the convergent mirror and the transparent pad. The transparent pad can have flat faces, parallel to one another. This simplifies the design of the transparent pad.

According to an example, the transparent pad is directly in contact with the basic optical component and the convergent mirror. The transparent pad can be manufactured directly on the basic optical component, for example by deposition of a hot-laminated transparent polymer. In this case, the transparent pad can mould the shape of the convergent mirror.

Except for incompatibility, technical characteristics described in detail for a given embodiment can be combined with the technical characteristics described in the context of other embodiments described as an example and in a non-limiting manner, so as to form another embodiment which is not necessarily illustrated or described. Such an embodiment is clearly not excluded from the invention.

In the scope of the present invention, the expression "ensuring the propagation of a light beam between a first light gate and a second light gate" means that the beam can be sent from the first light gate to the second light gate or conversely, that the beam can be sent from the second light gate to the first light gate. The light beam is propagated typically along an optical trajectory or path.

In the scope of the present invention, a "transparent" object or material means that the object or material lets at least 90% of the light intensity from the light beam pass through.

The transparent layer can have varied shapes. It can be qualified as a transparent pad without this expression limiting the shape that this layer can have. Thus, the transparent pad is not necessarily limited to a rectangular parallelepiped shape. It can possibly resemble a cylinder, or have hollow or projecting asperities, for example.

The term "reflection" or its equivalents refers to the phenomenon of reemission from a surface of an incident light beam, in one or more directions, having directions opposite to the incident direction. In the present description, a surface is considered as reflective as soon as it reemits at least 85% of the intensity of an incident light beam. The reflection can be specular (a reflection direction), or diffuse (several reflection directions).

It is specified that, in the scope of the present invention, the terms "on", "surmounts", "underlying", "opposite" and their equivalents do not necessarily mean "in contact with". Thus, for example, the deposition of a first layer on a second layer, does not compulsorily mean that the two layers are directly in contact with one another, but means that the first layer at least partially covers the second layer by being either directly in contact with it, or by being separated from it by at least one other layer or at least one other element.

A layer can, moreover, be composed of several sublayers of one same material or of different materials.

By a material A-"based" substrate, element, layer, this means a substrate, an element, a layer comprising this material A only or this material A and possibly other materials, for example alloy elements and/or doping elements.

A preferably orthonormal marker, comprising the axes x, y, z is represented in the accompanying figures. When one single marker is represented on one same set of figures, this marker applies to all the figures of this set.

In the present patent application, the height and the depth are taken along z. The beam is propagated along the optical axis and its shape develops as it propagates. In a plane transversal to the optical axis, the shape and the dimension of the beam are evaluated by considering the contour of the beam in this plane. The contour of the beam in a plane transversal to the optical axis is defined as the location of the points of this plane where the intensity is reduced by a factor $1/e^2$ relative to the centre of the beam on the optical axis, e being the Euler constant equalling approximately 2.71828. Thus, the shape of the beam can be, for example, circular and defined by a diameter, or for example elliptic and defined by a large diameter and a small diameter. In the general case, the size of the beam in a given transverse plane will be comprised as the maximum linear dimension between any two points of the contour of the beam in this plane. For a given transverse plane, the "section" or the "surface" of the beam are defined as the surface of the transverse plane located inside the contour of the beam. The "size" of this section or surface is defined as the size of the beam in the transverse plane considered.

Figure 2:
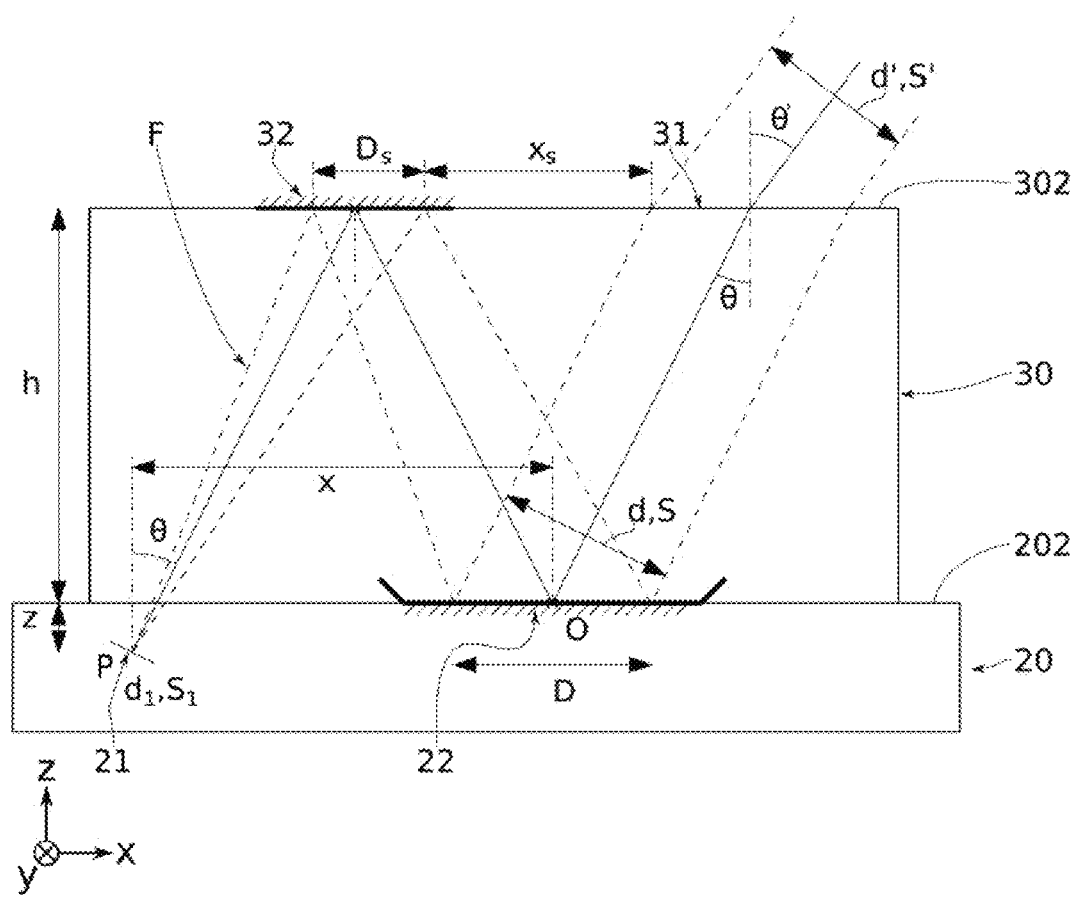
FIG. 2 schematically illustrates the propagation of a light beam according to an embodiment of the present invention.

According to a possibility, the size of the beam or the dimension characteristic of the beam is measured, at the internal light gate, in a plane orthogonal to the optical axis, for example the size $d_1$ of the surface $S_1$ in FIG. 2. The refraction of the beam at the external light gate typically causes a change in direction of the optical axis, at the interface between the transparent layer and the outside medium. This interface is called "third surface". There are therefore several possibilities for measuring the size of the beam at the external light gate. The size of the beam or the dimension characteristic of the beam can be measured, at the external light gate, in a plane orthogonal to the optical axis outside of the integrated optical component, for example the size d' of the surface S' in FIG. 2, or in a plane orthogonal to the optical axis within the transparent layer of the integrated optical component, for example the size d of the surface S in FIG. 2. According to another possibility, the size of the beam or the dimension characteristic of the beam is measured, at the external light gate, in the plane of the third surface. Thus, a "cross"-section or a "transverse" surface does not necessarily mean that this section or surface is orthogonal to the optical axis.

Relative terms such as "on", "surmounts", "under", "underlying", "above", "below" refer to positions taken in the direction z. This list of terms is not exhaustive. Other relative terms can be easily specified as needed, by referring to the accompanying drawings.

By an element located "at" another element, this means a positioning of this element on or in the immediately proximity of this other element. Typically, a plane mirror located at the third face means that the plane mirror is directly on this third face, or slightly offset relative to this third face, for example by being encapsulated in the transparent layer under the third face, at a maximum depth of 20% thick of said transparent layer. "At" indicates that a tolerance in positioning is permitted. This tolerance is around 20% as regards the ideal positions illustrated in the drawings.

The terms "vertical", "vertically" refer to a direction along z. The terms "horizontal", "horizontally" refer to a direction in the plane xy. The term "lateral", when this relates to a movement or a positioning, also refers to a direction in the plane xy.

An element located "vertically aligned with" or "to the right of" another element means that these two elements are both located on one same line oriented vertically in the figures.

Different embodiments of the integrated optical component are described below and illustrated in FIGS. 1 to 9. The principle of this optical component is to modify the size of a light beam, between an internal light gate—where a dimension characteristic of the beam is reduced—and an external light gate—where the dimension characteristic of the beam is expanded. The expanded characteristic dimension is preferably greater than three times the reduced characteristic dimension, and preferably greater than five times. The dimension characteristic of the beam can be typically a diameter, or a large axis or also a small axis of an ellipsis. Below, for clarity, "diameter" will simply be referred to, to mean this characteristic dimension. The light beam typically has a wavelength $\lambda$ of around 1.3 µm or 1.5 µm.

A first example of an integrated optical component 1 according to the invention is illustrated in FIG. 1.

The integrated optical component 1 comprises a basic optical component 20 carried by a substrate 10. The basic optical component 20 comprises an internal light gate 21. It has a lower face 201 and an upper face 202.

This basic optical component 20 can typically be a chip or an on-silicon photonic component formed from a silicon on insulator (SOI)-type substrate. Such an SOI substrate typically comprises, as a stack along z, a thin silicon layer called top Si, for example 300 nm thick, on a so-called Buried Oxide (BOX) layer, for example 800 nm thick, on a so-called "bulk" silicon solid substrate. The bulk silicon here forms the support substrate 10 of the basic optical component 20. The interface between the BOX and the bulk corresponds to the lower face 201 of the basic optical component 20.

The top Si layer is typically structured so as to form photonic elements, for example one or more waveguides 21'. The basic optical component 20 can comprise varied functions, like light electrooptical modulators, photodiodes, for example made of on-silicon germanium, filtering or routing functions, and metal electrical conductors 25 to control the different photonic elements.

All photonic and electrical elements are typically encapsulated in an insulating and transparent dielectric material-based encapsulation layer 23, like silica. Below, it will be considered that the encapsulation layer 23 is made of silica and has a refraction index n=1.45.

According to a non-illustrated possibility, other types of basic optical components 20 can also be considered, for example circuits manufactured from materials III-V or II-VI.

In the example illustrated in FIG. 1, the top Si layer is structured at the end of the waveguide 21' to form a diffraction network 21a. This diffraction network 21a here forms the internal light gate 21. It is oriented upwards, i.e., it is configured as a vertical coupler to emit or receive a light beam F through the upper face 202. The diffraction network 21a can be seen as an output gate or as an input gate in the direction of the light. Here, it forms a two-directional internal light gate 21.

Along the optical axis of the light beam F, the shape and the size of the beam evolve. Below in the description, it will be considered that the shape of the beam is circular, or elliptic with a symmetry plane xz. In the case of an elliptic beam, the word "diameter" will mean the diameter of the ellipsis, which is located in the symmetry plane xz.

The light beam F typically has a first section of reduced size at the internal light gate 21, referenced $S_1$. This section, if it is circular or elliptic, typically has a diameter $d_1$ in the plane xz, referenced in FIG. 2. This reduced diameter $d_1$ is at the internal light gate 21. This reduced diameter $d_1$ is, for example, around 9 µm. As illustrated in FIG. 1, the light beam F is typically oriented upwards with an angle $\theta$ of around 8° relative to the vertical.

The basic optical component 20 also includes a convergent mirror 22 at its upper face 202, oriented upwards, and of diameter greater than or equal to the width D of the beam at this level, the width of the beam being measured in the horizontal direction x. The width D is referenced in FIG. 2.

The integrated optical component 1 also comprises a transparent layer 30, also called transparent pad 30, placed on the surface of the basic optical component 20. This transparent pad 30 can have varied shapes, for example a rectangular parallelepiped shape, without this particular shape being limiting. This transparent pad 30 is positioned above the internal light gate 21 and the convergent mirror 22. It has on its upper face 302, a flat reflective zone or plane mirror 32. The transparent pad 30 can typically have flat faces 301, 302, parallel to the plane xy. The plane mirror 32 makes it possible to reflect the light beam F within the transparent pad 30 to establish a light trajectory between the internal light gate 21 and the convergent mirror 22. Thus, a light beam emitted by the internal light gate 21 is propagated upwards in the basic optical component 20, then in the transparent pad 30, while widening. The light beam F is then reflected by the plane mirror 32 in the direction of the convergent mirror 22. The light beam F returns, in this way, into the transparent pad 30, while widening, before being collimated by the convergent mirror 22. The collimated light beam F is then directed upwards in the direction of the external light gate 31. It thus exits from the integrated optical component 1.

The thickness h of the pad 30 is chosen to offer a sufficient path length, such that the light beam F widens during its trajectory until reaching a diameter d after reflection on the convergent mirror 22. The larger d is, the better the tolerance is to misalignment. The thickness h and the focal distance of the convergent mirror can be, in particular, chosen or determined according to one another.

As illustrated in FIG. 2, generally P will be noted, the point located at the centre of the neck of the light beam coupled with the internal light gate 21, $d_1$ the diameter of the beam at this neck. The emission angle $\theta$ is taken between the central radius of the light beam called optical axis and the vertical along z. The section of the beam between the convergent mirror 22 and the external light gate 31 is referenced S. This section, if it is circular or elliptic, typically has a diameter referenced d. By exiting the external light gate 31, the light beam can have an angle $\theta'$ different from the angle $\theta$, and a section S' or a diameter d'. This is typically due to a phenomenon of light refraction at the face 302. The light beam F thus has a second section of expanded size at the external light gate 31. This second section can have the surface S, inside the integrated optical component, or the surface S' outside of the integrated optical component.

The expanded section of the light beam F thus has a second surface S or S' of strictly greater size, preferably at least three times greater, and more preferably, at least five times greater, than the size of the first surface $S_1$ taken at the internal gate 21.

It is reminded that the law of optics commonly called "principle of reversibility of light" indicates that a light trajectory travelled in a direction can also be travelled in the opposite direction, which means that the reasonings set out in the case of an "output" light gate, i.e. emitting the light beam, can be rewritten in the case of an "input" light gate, i.e. receiving the light beam, by reversing the direction of the light path. Thus, ensuring the propagation of a light beam between a first light gate and a second light gate means that the beam can be propagated from the first light gate to the second light gate, or conversely, that the beam can be propagated from the second light gate to the first gate.

Figure 3:
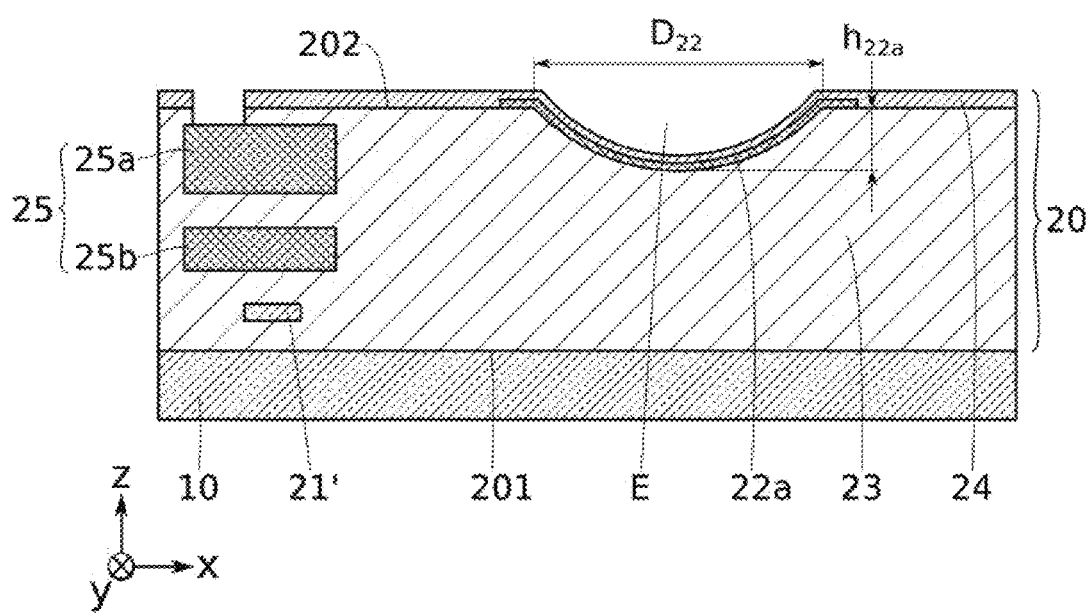
FIG. 3 schematically illustrates a basic optical component according to an embodiment of the present invention.

FIG. 3 illustrates in more detail, an embodiment of the basic optical component 20. In this example, a curved convergent mirror 22a of centre O and of focal distance f, is manufactured at the upper face 202 of the component 20. This convergent mirror 22a has a diameter sufficient for reflecting a beam of diameter d. The diameter of the mirror $D_{22}$ is, for example, of between 30 and 100 microns, typically of around 70 μm. The convergent mirror 22a can have a height h22a of between 0.5 and 3 microns, for example of around 1.2 microns.

Such a curved mirror can be achieved thanks to greyscale photolithography. The pattern obtained by this greyscale photolithography is then transferred by etching in the silica encapsulation layer 23. A deposition of a reflective layer, for example an aluminium layer of AlSi layer, around 200 nm thick, is made at the transferred pattern. A curved mirror 22a is thus obtained. Preferably, but optionally, a protective transparent layer 24 (for example, a silicon nitride layer) is formed on the mirror 22a and on the upper face 202 of the basic optical component 20. Advantageously, the thickness of the silicon nitride-based protective layer 24 can be chosen so as to form an antireflective layer.

According to another possibility, the encapsulation layer 23 is polymer material-based and the curved mirror 22a is manufactured by embossing the polymer material using a mould ("nano-imprint lithography"). The curved surface thus obtained is then covered with a reflective layer, for example by aluminium deposition.

Figure 4:
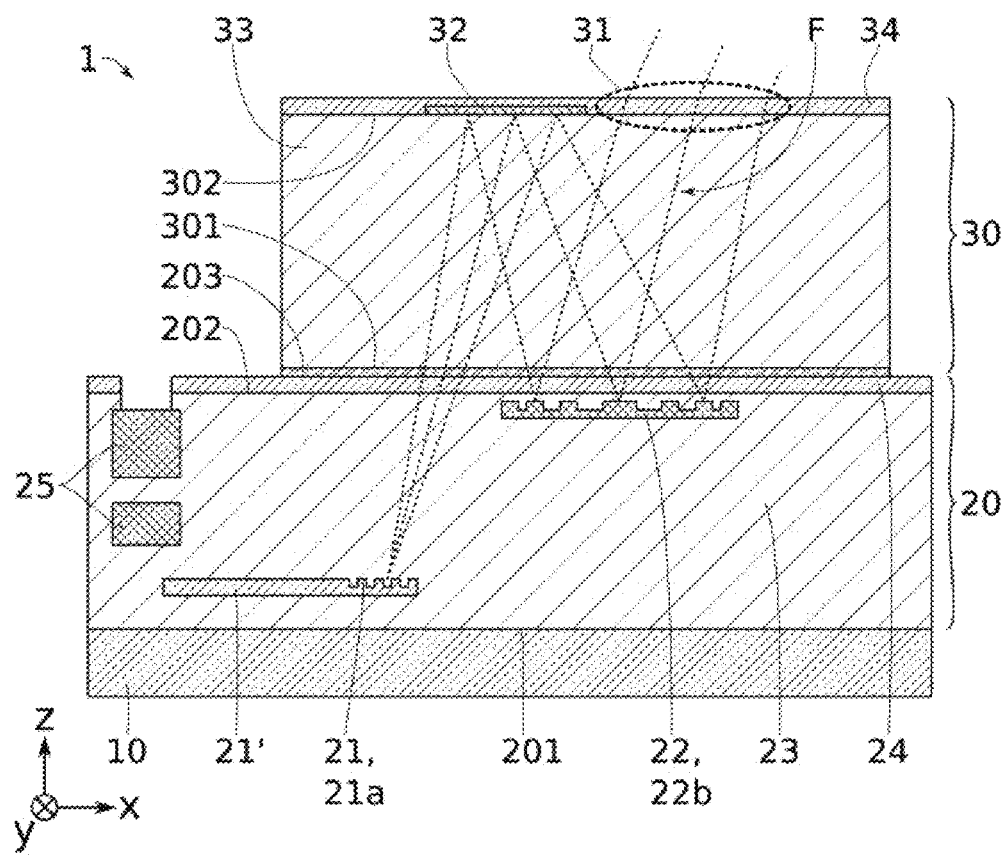
FIG. 4 schematically illustrates an integrated optical component according to another embodiment of the present invention.

Other types of convergent mirror can be considered. FIG. 4 illustrates, for example, a convergent mirror 22b of the Fresnel mirror or diffractive mirror type. Such a diffractive mirror can be binary or also multi-level. It is typically defined with a fineness which could be less than the wavelength of light ("sub-wavelength diffractive mirror").

The convergent mirror 22 is oriented upwards, i.e. that it is reflective and convergent for light beams going from top to bottom. The axis of the mirror in its centre O is typically vertical, but the mirror can also be designed such that its axis is included, to modify the orientation of the beam after reflection.

Figure 5:
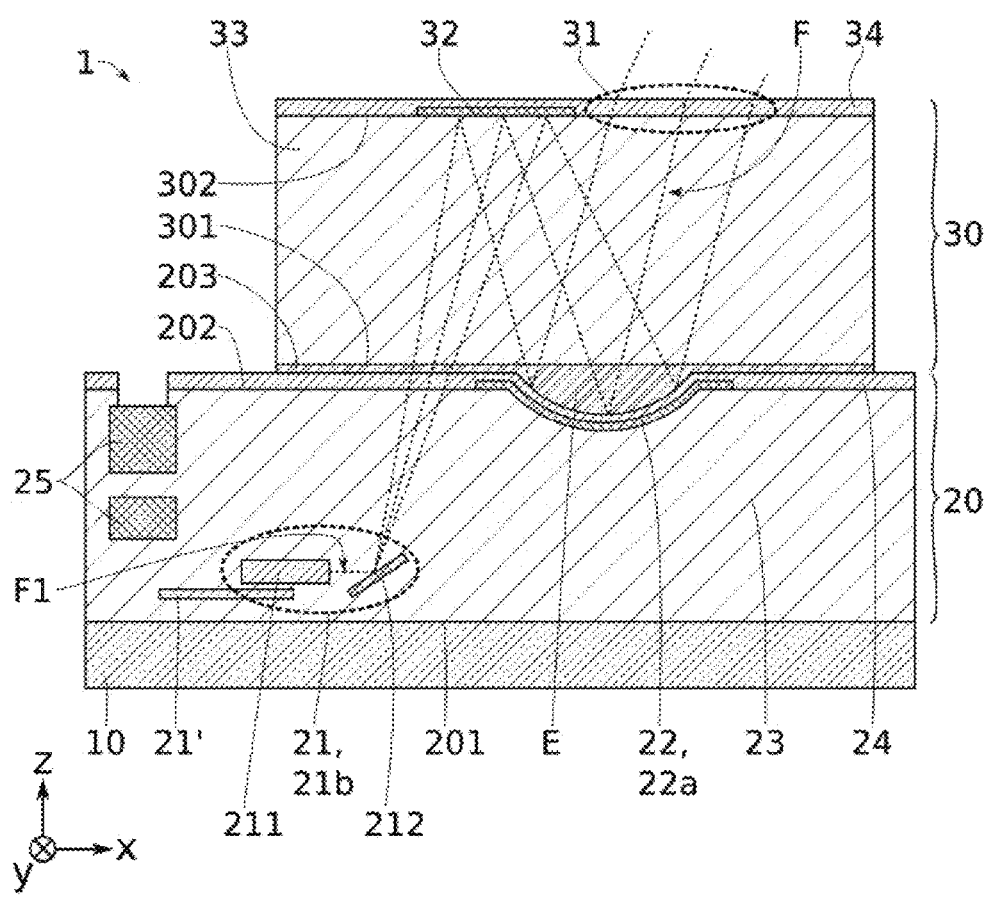
FIG. 5 schematically illustrates an integrated optical component according to another embodiment of the present invention.

FIG. 5 illustrates another embodiment of the integrated optical component 1 wherein the internal light gate 21 is of the "side coupler" type. In this example, the waveguide 21' is coupled with a mode convertor 211 associated with a deflector mirror 212. The internal light gate 21 is therefore here a composite light gate composed of the mode convertor 211 and the deflector mirror 212.

The size of the optical mode guided by silicon waveguides 21' being generally less than 1 micron, it is advantageous to use a mode convertor 211, for example made of silicon nitride, to produce a beam F1 of a wider diameter, for example $d_1=6$ μm. This beam F1 is then returned by the mirror 212 according to an angle θ in the direction of the plane mirror 32. As in the case of the coupling network 21a illustrated in FIG. 1, the light gate 21b is a two-directional gate. In the scope of the present invention, the details of the composition and of the manufacture of this composite gate will not be approached and it will be considered as an entity characterised only by the two parameters θ and $d_1$ mentioned above.

Figure 6:
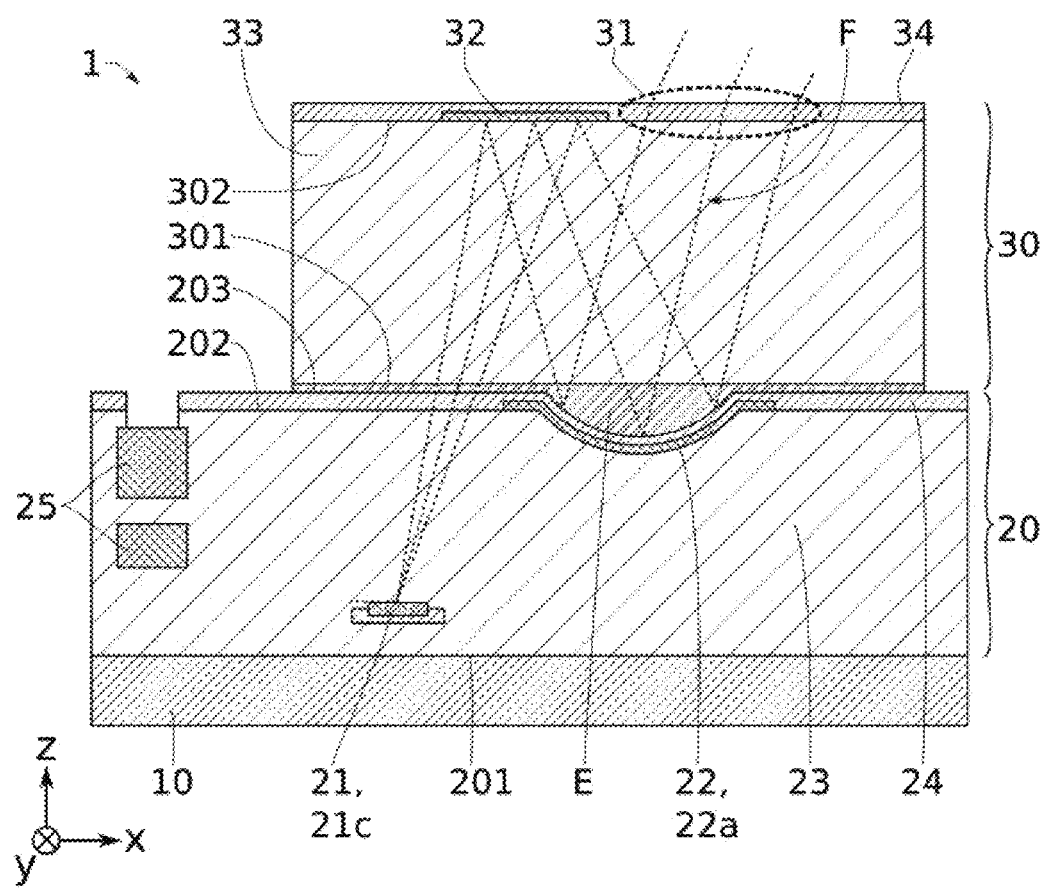
FIG. 6 schematically illustrates an integrated optical component according to another embodiment of the present invention.

According to another embodiment illustrated in FIG. 6, the internal light gate 21 can also be a photoreceiver 21c like a germanium photodiode. Such a photodiode can be manufactured, for example in a silicon cavity, with a diameter $d_1=9$ μm for example. This internal light gate 21, 21c is thus only a light input gate. Other types of internal light gates 21 can be considered, like a vertical cavity surface emitting laser (VCSEL), which will thus be a light output gate.

In the integrated optical component 1, a transparent pad 30 is associated with the basic optical component 20. This transparent pad 30 comprises a plane mirror 32 and the external light gate 31 at its face 302. Such a transparent pad 30 can be manufactured in several ways.

In a first embodiment, this transparent pad 30 is manufactured separately from the basic optical component 20. The transparent pad 30 is here typically manufactured from a silica substrate 33 on which a plane mirror 32 will have been prepared by photolithography, for example in the form of an aluminium-based layer. To protect this plane mirror 32, a transparent encapsulation mirror 34, for example silicon nitride-based, is preferably formed on the mirror 32 and on the face 302 of the transparent pad 30. Advantageously, the thickness of the silicon nitride-based encapsulation layer 34 can be chosen so as to form an antireflective layer.

The transparent pad 30 can then be bonded on the basic optical component 20, above the internal light gate 21 and the convergent mirror 22, as illustrated in the different FIGS. 1 to 9. The plane mirror 32 of the transparent pad 30 must be positioned so as to reflect the light coming from the internal light gate 21 of the basic component 20 without blocking the light then reflected by the convergent mirror 22. Due to the flatness of the plane mirror 32 and of the faces 301, 302 of the transparent pad 30, the precision of the positioning is not critical. A horizontal translation of a few microns, even a few tens of microns, is thus tolerated. Therefore, placement machines having a limited precision and a high speed can be used to perform this operation of extending the transparent pad 30 on the basic optical component 20. This is advantageous in a context of industrially producing integrated optical components 1.

Bonding can be done using a transparent, polymer-based adhesive layer 203, also called polymer interposing layer. This advantageously makes it possible to fill the cavity or the space E present above the convergent mirror 22, typically in the case of a curved mirror 22a. An adhesive layer 203 having a refraction index capable of limiting interfering reflections between the basic optical component 20 and the transparent pad 30 will be preferred to be chosen. In the case where the encapsulation layer 23 of the basic optical component 20 is made of silica and the substrate 33 of the transparent pad 30 is also made of silica, typically an adhesive layer 203 with a refraction index close to that of silica will be chosen. In particular, a polymerising adhesive layer 203 under ultraviolet insolation can be used, to freeze the position of the transparent pad 30 during its implementation. Furthermore, it can be advantageous to use a "dual-cure"-type adhesive layer 203, which makes it possible to freeze the transparent pad 30 rapidly by a first short ultraviolet insolation, then to subsequently proceed with an overall thermal annealing to end the polymerisation of the adhesive layer 203, for example when all the transparent pads 30 are placed on the basic optical components 20, in the scope of a collective extension on one another.

To precisely define the distance h separating the mirror 32 of the upper face 202 from the component 20 during bonding, it is possible to use spacers (not illustrated), for example flat contact terminals manufactured on the lower face 301 of the transparent pad 30, or calibrated shims, or also calibrated balls dispersed in the adhesive layer 203.

Other means for bonding the transparent pad 30 can be considered, for example direct bonding (also called "molecular bonding"), in the case where the upper face 202 of the component 20 is flat and has a flatness and a roughness compatible with direct bonding.

Advantageously, the transparent pads 30 are implemented collectively on basic optical component 20 wafers, in order to benefit from the effectiveness of a collective extension method. After extending the transparent pads 30, the wafers are typically cut at the end of manufacture to produce individual integrated optical components 1.

In another embodiment, the transparent pad 30 is formed directly on the basic optical component 20 by depositing a transparent polymer material. The transparent pad 30 can, in this case, be for example formed from a hot-laminated polymer film on the basic optical component 20, on which the plane mirror 32 is then formed by photolithography. For example, a transparent polymer varnish-based protective layer can then be applied on the polymer film and the plane mirror 32.

Below, sizing and tolerancing examples are detailed. The modelling and the notations used for the calculations are illustrated in FIG. 2. The calculations are here made for a wavelength $\lambda=1.310$ µm (in the vacuum). These calculations can be transposed to any other wavelength. To simplify matters, the situation will be referred to, where the materials passed through all have the refraction index of silica, $n=1.447$. A convergent mirror 22 of centre O having a vertical axis is considered. The internal light gate 21 is generally at a distance z below the altitude of the centre O of the mirror 22, typically of a few microns, for example $z=4$ µm. The less common case where the internal light gate 21 is at an altitude greater than that of the centre of the mirror 22 will correspond to a negative altitude value z. However, this value of z is small before the thickness h of the transparent pad 30, and it can generally be overlooked in the calculations.

The light beam F is considered as a Gaussian monomode beam, which is a good approximation of reality. The divergence of the Gaussian beam is $\Delta\theta \approx 4\lambda/(\pi n d_1)$. To obtain a beam of diameter according to the reflection on the convergent mirror 22, it must be left to widen over a length $L=d/\Delta\theta$. The thickness of the transparent pad necessary is therefore $h=L/2 \cos(\theta)$. To produce a collimated beam F, the focal distance f of the convergent mirror 22 is preferably equal to L. This situation is typically sought for the integrated optical component 1.

In a first approximation, the mirror 22 can be spherical, of bend radius $R=2 f$. However, to consider the oblique incidence of angle $\theta$, an ellipsoidal surface of radii $R1=2 f/\cos(\theta)$ in the incidence plane (plane xz in FIG. 2) and $R2=2 f \cos(\theta)$ in the sagittal plane (perpendicular to the incidence plane) can be considered. Generally, a person skilled in the art will determine the ideal surface by using optical design software, for example Zemax, Oslo or CODE V. The surface of the mirror 22 is of a size greater than that of the internal light gate.

The light beam F exits from the transparent pad 30 by the external light gate 31 to be propagated into a medium of refraction index n', with a diameter d' and in a direction of angle $\theta'$. The typical case where the exiting of the light beam F is done into air will be considered, i.e. with $n'=1$.

The refraction relationship $n \sin(\theta)=n' \sin(\theta')$ can be written, which gives the output angle $\theta'=\arcsin(n \sin(\theta)/n')$ as a function of e. The geometric relationship $d/\cos(\theta)=d'/\cos(\theta')$ can also be written, which gives the diameter of the beam at the convergent mirror 22: $d=d' \cos(\theta)/\cos(\theta')$ as a function of d'.

The horizontal diameter D of the beam at the convergent mirror 22 is $D=d/\cos(\theta)$. The convergent mirror 22 must have a diameter greater than or equal to D.

At the plane mirror 32 on the upper face 302 of the transparent pad 30, the horizontal diameter of the beam is $D_s=L\cdot 2\cdot\Delta\theta/\cos(\theta)$. The plane mirror 32 must have a diameter greater than or equal to $D_s$. Such that this geometry is achieved in practice, the margin $x_s$ between the edge of the beam at the plane mirror 32 and the edge of the beam emerging at the external light gate 31 must be determined, after reflection on the convergent mirror 22. This makes it possible to verify that the edge of the plane mirror 32 does not risk concealing some of the exiting beam. The margin $x_s$ can be calculated according to: $x_s=L \sin(\theta)-(D+D_s)/2$.

Another challenge of this modelling relates to the tolerance of the optical system to the geometric variations. In particular, it is possible to determine the sensitivity of the coupling between the internal and external light gates 21, 31 according to a variation in the height h of the transparent pad 30, or equally, according to a variation in the thickness of the polymer adhesive layer 203 under the transparent pad 30. The distance x between the internal light gate 21 and the centre O of the convergent mirror 22 varies according to $\delta x/\delta h=2 \tan(\theta)$. The variation in the position $x_1$ of the beam in the plane of the internal light gate is linked to the variation in x by $\delta x_1=\delta x\cdot\cos(\theta)$. Thus, $\delta x_1/\delta h=\delta x/\delta h \cos(\theta)=2 \sin(\theta)$ is had. The variation in thickness $\delta h$ which produces a difference $\delta x_1$ is therefore $\delta h=\delta x_1/(2 \sin(\theta))$. According to the difference $\delta x1$ relative to the centre of the light gate 21, the transmission in the light gate 21, assumed Gaussian, is $T=\exp(-4 (\delta x_1/d_1)^2)$. The transmission T equals, for example, $T=85\%$ for a difference $\delta x_1=d_1/5$. The variation in height corresponding to this situation will be called $\delta h(85\%)$. This variation in height equals $\delta h(85\%)=(d_1/5)/(2 \sin(\theta))=d_1/(10 \sin(\theta))$.

Complementarily, the angular and spatial tolerances are indicated for a beam exiting into a medium of refraction index $n'=1$. The angular width of the output beam is $\theta' \approx 4\lambda/(\pi n' d')$. For an angular difference $\delta\theta'$ of the beam, the transmission in the external light gate 31 evolves according to $T=\exp(-4 (\delta\theta'/\theta')^2)$ and equals, for example, $T=85\%$ for $\delta\theta'=\theta'/5$, value that will be noted $\delta\theta'(85\%)$. For a difference $\delta x'$ of the incident beam relative to its ideal position, the transmission in the external light gate evolves according to $T=\exp(-4 (\delta x'/d')^2)$. The value of the difference corresponding to a transmission reduced to $T=85\%$ will be called $\delta x'(85\%)$.

Table 1 below presents the calculations made in three configurations for a diameter of exiting mode d' of 50 µm. The three left-hand columns are the input parameters from which the other parameters are deduced.

TABLE 1

| $d_1$ (μm) | θ (°) | d' (μm) | d (μm) | D (μm) | Δθ (°) | L (μm) | h (μm) | $x_s$ (μm) | δh(85%) (μm) | δθ'(85%) (°) | δx'(85%) (μm) |
|---|---|---|---|---|---|---|---|---|---|---|---|
| 9.0 | 8.0 | 50.0 | 50.5 | 51.0 | 7.3 | 395 | 195 | 17 | 6.5 | 0.38 | 10 |
| 6.0 | 11.0 | 50.0 | 51.1 | 52.0 | 11.0 | 266 | 130 | 12 | 3.1 | 0.38 | 10 |
| 4.0 | 17.0 | 50.0 | 52.8 | 55.2 | 16.5 | 183 | 88 | 12 | 1.4 | 0.38 | 10 |

Table 2 presents the calculations made in three configurations for a diameter of exiting mode d' of 70 μm.

TABLE 2

| $d_1$ (μm) | θ (°) | d' (μm) | d (μm) | D (μm) | Δθ (°) | L (μm) | h (μm) | $x_s$ (μm) | δh(85%) (μm) | δθ'(85%) (°) | δx'(85%) (μm) |
|---|---|---|---|---|---|---|---|---|---|---|---|
| 9.0 | 8.0 | 70.0 | 70.8 | 71.5 | 7.3 | 553 | 274 | 23 | 6.5 | 0.27 | 14 |
| 6.0 | 10.0 | 70.0 | 71.2 | 72.3 | 11.0 | 371 | 183 | 10 | 3.5 | 0.27 | 14 |
| 4.0 | 16.0 | 70.0 | 73.4 | 76.3 | 16.5 | 255 | 122 | 13 | 1.5 | 0.27 | 14 |

In all the configurations presented, the margin $x_s$ is greater than 10 μm, which leaves a comfortable tolerance for the position of the edge of the plane mirror 32. In the case where the transparent pad 30 is assembled to the basic optical component 20 by extension, this extension can therefore be made by using chip placement equipment ("pick-and-place" equipment) offering a precision of ±10 μm, which is common for industrial equipment. This placement tolerance is comfortable and advantageous compared with known solutions which require a more delicate placement (typically ±2 μm). Furthermore, the tolerance to the misalignment between the integrated optical component according to the invention and an optical connector increases with the expansion of the beam.

The tolerance in thickness δh(85%) of the transparent pad 30 varies from 1.4 to 6.5 μm according to the configurations. During the manufacture of the transparent pads, the thickness of the substrates 33 can be controlled to ±1 μm or better by using suitable polishing and measuring methods. The bonding can also be optimised with the same precision by using spacers. The configurations described here can therefore be achieved in practice. Preferably, an internal light gate 21 of diameter $d_1$ as wide as possible will be chosen, for example 6 or 9 μm as it is this situation which offers the widest tolerance for the thickness h.

Figure 7:
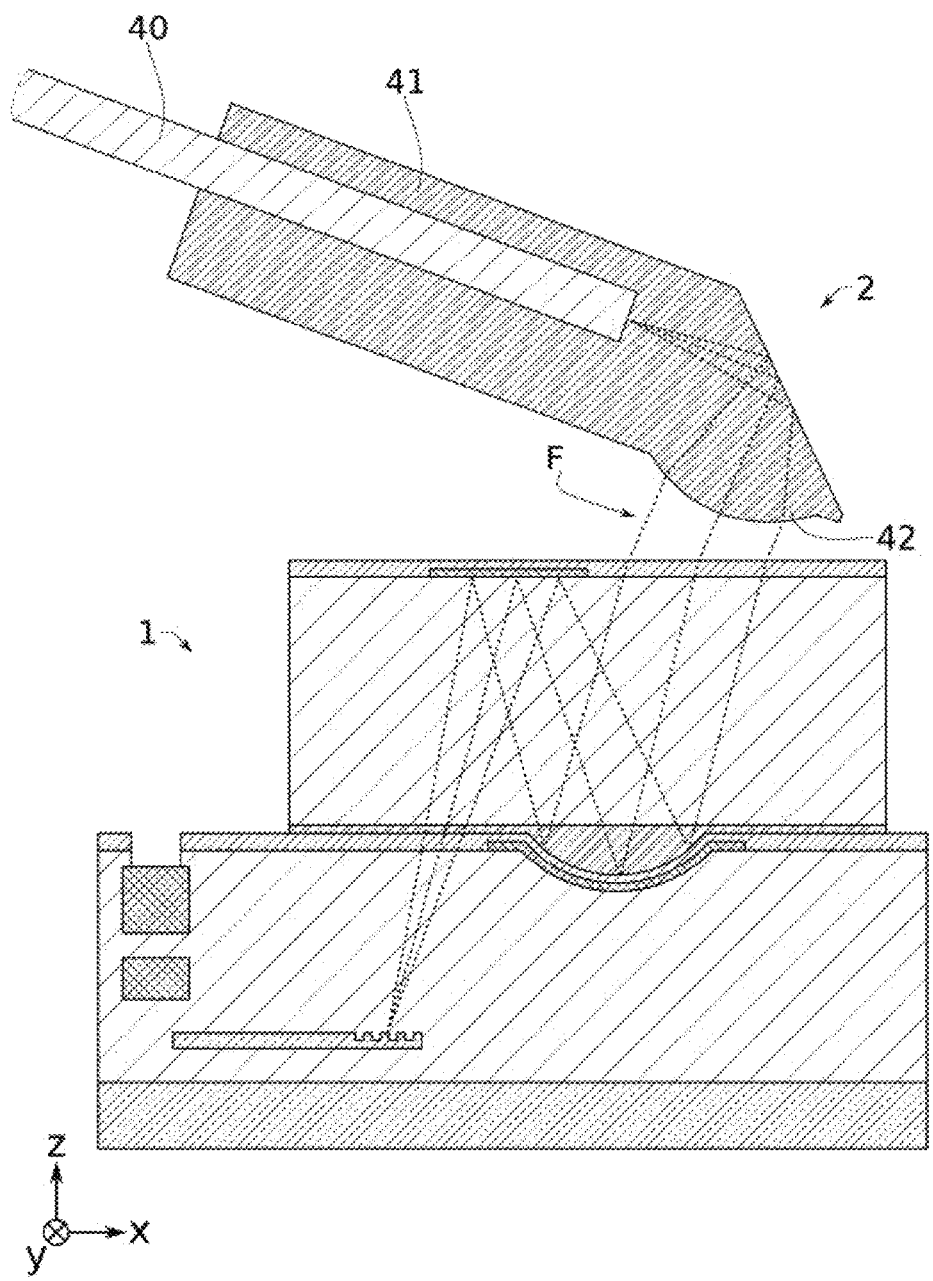
FIG. 7 schematically illustrates an optical interconnecting system according to an embodiment of the present invention.
Figure 8:
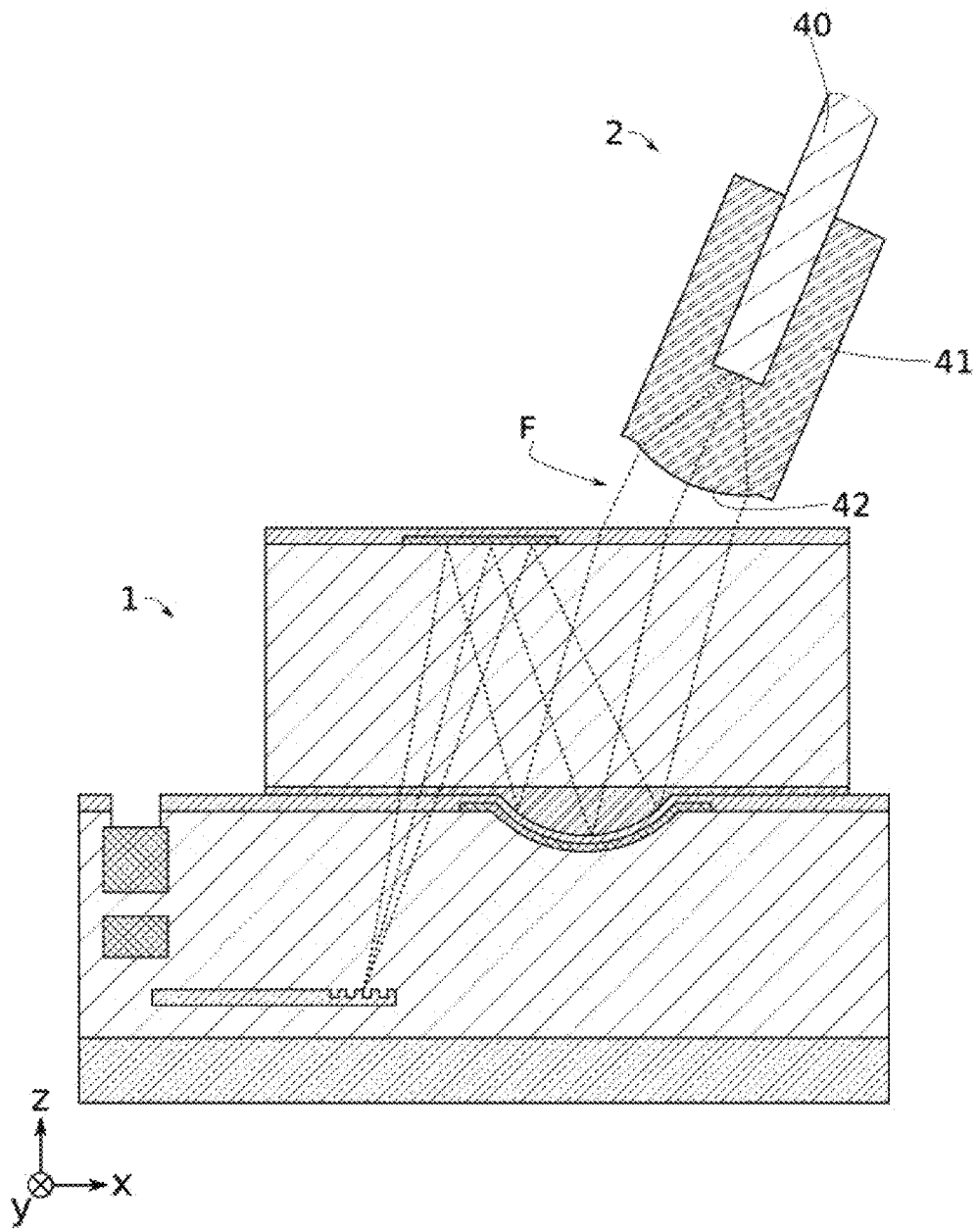
FIG. 8 schematically illustrates an optical interconnecting system according to another embodiment of the present invention.
Figure 9:
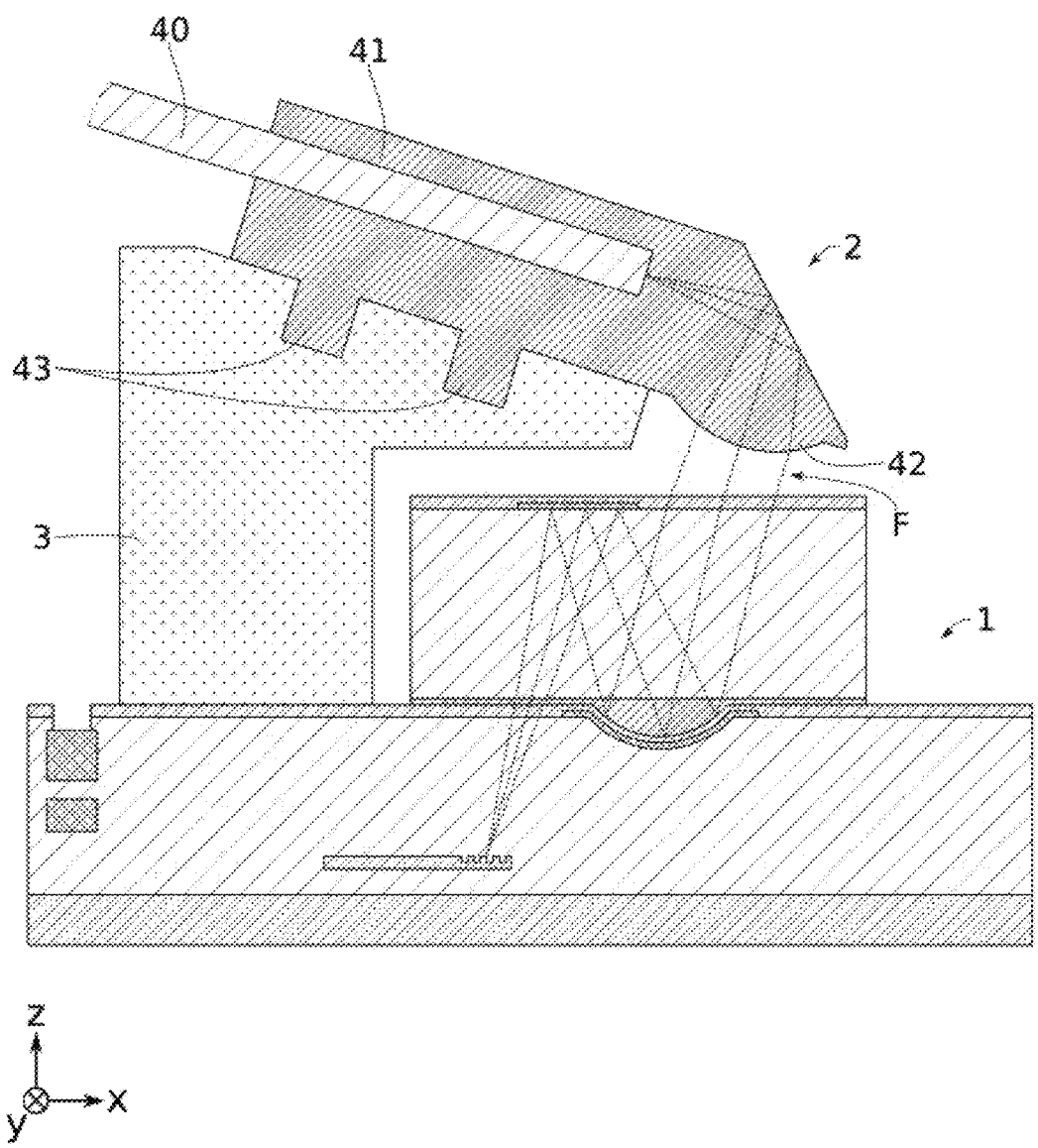
FIG. 9 schematically illustrates an optical interconnecting system according to another embodiment of the present invention.

As illustrated in FIGS. 7, 8 and 9, the integrated optical component 1 comprising a transparent pad 30 according to the present invention can be used with a fibre optical connector 2 configured to be coupled with an expanded beam.

Such a connector 2 typically comprises one or more microlenses 42 at the end of the optical fibres 40. This type of connector is in particular commercialised at Senko. The connector 2 can also comprise a sleeve or ferrule 41 which deviates the light from the optical fibres 40 using a deflector mirror and a microlens, or a curved deflector mirror. This makes it possible to modify the direction of the beam, to expand it and to collimate it. This type of connector is in particular commercialised at USConec.

According to the geometry of the optical connector 2 considered, its orientation relative to the integrated optical component 1 must be adapted such that the optical axes are correctly aligned. FIGS. 7 and 8 have two positioning and alignment possibilities relating to the connector 2 as regards the integrated optical component 1.

As illustrated in FIG. 9, a mechanical base 3 can also be provided to ensure a reproducible positioning according to the tolerances stated above. In particular, the lateral tolerance δx'(85%) of 10 μm or more makes it possible to consider a simple mechanical interlocking of the optical connector 2 on the mechanical base 3 to ensure this alignment precision. It is a relaxed tolerance compared with the precision of ±2 μm typically necessary for the connection of bare optical fibres directly bonded above an internal light gate of a conventional integrated optical component. This mechanical base 3 can thus engage with the connector 2 via simple lugs 43.

The integrated optical component 1 according to the present invention makes it possible to use a great variety of optical connectors. The transparent pad and the convergent mirror can in particular be sized with the formulas stated above to produce an expanded beam exiting from the integrated optical component with a diameter d' equal to the nominal mode diameter of the optical connector 2 considered. The focal distance of the convergent mirror 22 used in the basic optical component 20, as well as the diameter $d_1$ of the internal light gate 21 are not constrained by the choice of the connector 2, contrary to the solutions known from the state of the art.

Furthermore, in the present invention, the beam does not pass through the substrate 10 and there are therefore no inconvenient interfering reflections. Using transparent materials like silica and the implementation of antireflective layers on easily accessible faces 202, 302 makes it possible to propose a solution significantly limiting the optical losses. Furthermore, as the expansion of the beam does not depend on the substrate 10, the thickness of the substrate 10 will not be constrained by the choice of the diameter d, d' of mode sought. This substrate 10 thickness can thus be chosen independently to accommodate other constraints (for example, to ensure an optical thermal dissipation, or to enable the use of through vias TSV). This makes it possible to consider a greater versatility in design of the integrated optical component 1.

It clearly emerges from the description above, that the integrated optical component 1 according to the invention has small optical losses, enables a facilitated assembly (a placement of the transparent pad with a precision of 10 microns suffices), and can be associated with different connectors on the market (without being linked to a specific connector during design).

The invention is not limited to the embodiments described above.

The invention claimed is:

1. An integrated optical component configured to ensure a propagation of a light beam between an internal light gate and an external light gate, the light beam having an optical axis, a first surface taken transversally to the optical axis of the beam taken at the internal light gate, and a second surface taken transversally to the optical axis of the beam taken at the external light gate, such that the second surface is of strictly greater area than the first surface, the integrated optical component comprising a basic optical component comprising the internal light gate,
   the basic optical component having a lower face, and an upper face, opposite the lower face,
   the internal light gate being configured to emit or receive the light beam respectively divergent or convergent, along a trajectory passing through the upper face of the basic optical component, wherein
   the integrated optical component further comprises a transparent layer arranged on the upper face of the basic optical component, the transparent layer having a third face, facing and parallel to the upper face of the basic optical component, the transparent layer comprising the external light gate at the third face,
   the transparent layer comprises a plane mirror located at the third face and rotated facing the upper face of the basic optical component, and the basic optical component comprises a convergent mirror rotated facing the third face of the transparent layer,
   the plane and convergent mirrors are arranged such that the light beam is propagated between the internal light gate and the external light gate by passing through the transparent layer by reflection on the plane mirror and by reflection on the convergent mirror, and
   the internal light gate being arranged entirely below the convergent mirror and the convergent mirror being arranged below the external light gate.

2. The integrated optical component according to claim 1, wherein the plane mirror is interposed on the trajectory of the light beam between the internal light gate and the convergent mirror, and wherein the convergent mirror is interposed on the trajectory of the light beam between the external light gate and the plane mirror.

3. The integrated optical component according to claim 1, wherein the internal light gate is configured such that the light beam has light rays not parallel to one another between the internal light gate and the plane mirror, and between the plane mirror and the convergent mirror.

4. The integrated optical component according to claim 1, wherein the convergent mirror is configured such that the light beam has light rays parallel to one another between the external light gate and the convergent mirror.

5. The integrated optical component according to claim 1, wherein the convergent mirror has a focal distance f of between 0.8 L and 1.2 L, L being a length of the trajectory of the light beam being propagated between the internal light gate and the convergent mirror.

6. The integrated optical component according to claim 1, configured such that the trajectory of the light beam between the internal light gate and the plane mirror passes through the upper face at a periphery of the convergent mirror.

7. The integrated optical component according to claim 1, wherein the external light gate is located at a periphery of the plane mirror.

8. The integrated optical component according to claim 1, wherein the internal light gate is configured to emit or receive the light beam along an optical axis having an angle θ of between 5° and 20° with respect to a direction normal to the upper and third faces.

9. The integrated optical component according to claim 1, wherein the convergent mirror is chosen from among a spherical or parabolic curved mirror, a Fresnel mirror, and a diffractive mirror.

10. The integrated optical component according to claim 1, wherein the internal light gate is chosen from among a diffraction network, a deflector mirror associated with an end of a waveguide, a photodetector, and a vertical cavity surface emitting laser.

11. The integrated optical component according to claim 1, wherein the transparent layer has a height h taken along a direction normal to the third face of between 50 μm and 300 μm.

12. The integrated optical component according to claim 1, wherein the second surface of the light beam has an area at least three times greater than an area of the first surface.

13. The integrated optical component according to claim 1, comprising a polymer interposing layer between the transparent layer and the basic optical component.

14. The integrated optical component according to claim 13, wherein the transparent layer and the basic optical component are silica-based having a refraction index n and wherein the polymer interposing layer is transparent polymer-based having a refraction index $n_p$ such that $0.9 n \leq n_p \leq 1.1 n$.

15. The integrated optical component according to claim 13, wherein the polymer interposing layer fills a space between the convergent mirror of the basic optical component and the transparent layer.

16. A method for manufacturing an integrated optical component according to claim 13, comprising:
   forming the basic optical component and the convergent mirror on a first substrate,
   forming the transparent layer and the plane mirror on a second substrate, and
   assembling the transparent layer on the basic optical component using the polymer interposing layer.

17. The integrated optical component according to claim 1, wherein the transparent layer is directly in contact with the basic optical component and with the convergent mirror.

18. A system comprising at least one integrated optical component according to claim 1, and an optical connector coupled with the external light gate.

19. The integrated optical component according to claim 1, wherein
   the internal light gate is disposed entirely within the basic optical component and is configured to emit light though the upper face, and
   the convergent mirror is disposed on the upper face.

* * * * *